United States Patent
Gassion et al.

(10) Patent No.: US 9,797,986 B2
(45) Date of Patent: Oct. 24, 2017

(54) METHOD FOR DETERMINING THE GEOGRAPHIC POSITION OF AN EQUIPMENT

(71) Applicant: Schneider Electric Industries SAS, Rueil Malmaison (FR)

(72) Inventors: Romain Gassion, Izeaux (FR); Roland Goutay, Saint Nazaire les Eymes (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 15/193,332

(22) Filed: Jun. 27, 2016

(65) Prior Publication Data

US 2017/0082726 A1    Mar. 23, 2017

(30) Foreign Application Priority Data

Sep. 17, 2015  (FR) ...................... 15 58720

(51) Int. Cl.
   *H04W 64/00* (2009.01)
   *G01S 5/02* (2010.01)
   *G01S 1/08* (2006.01)

(52) U.S. Cl.
   CPC .............. *G01S 5/0284* (2013.01); *G01S 1/08* (2013.01); *G01S 5/02* (2013.01); *H04W 64/00* (2013.01)

(58) Field of Classification Search
   CPC .................................................... H04W 64/00
   USPC ........................................... 455/456.1–456.6
   See application file for complete search history.

(56) References Cited

U.S. PATENT DOCUMENTS

| | | |
|---|---|---|
| 9,084,013 B1 | 7/2015 | Arini et al. |
| 2011/0269479 A1 | 11/2011 | Ledlie |
| 2014/0128099 A1 | 5/2014 | Ledlie |
| 2016/0261986 A1* | 9/2016 | Nord ...................... H04W 4/023 |
| 2016/0286522 A1* | 9/2016 | Farrell .................. H04W 68/02 |
| 2017/0025861 A1* | 1/2017 | Lee ........................... H02J 4/00 |

OTHER PUBLICATIONS

French Preliminary Search Report dated May 10, 2016 in French Application 15 58720 filed Sep. 17, 2015 (with English Translation of Categories of Cited Documents).

* cited by examiner

*Primary Examiner* — Michael T Vu
(74) *Attorney, Agent, or Firm* — Oblon, McClelland, Maier & Neustadt, L.L.P.

(57) ABSTRACT

A method for determining the geographical position of at least one equipment unit using a device constrained to move with the equipment unit, the method including a first step of determination by the device, when the latter is fixed and has not been subjected to any movement for a first particular time, of network data including the identifiers of beacons of communication networks situated in the environment of the device and the Received Signal Strength Indication of the signals sent by each beacon, a second step of said device sending the network data to a data processing unit via a communication network if the communication network is available, the determination step and the sending step being repeated after each movement of the device to a new position.

9 Claims, 1 Drawing Sheet

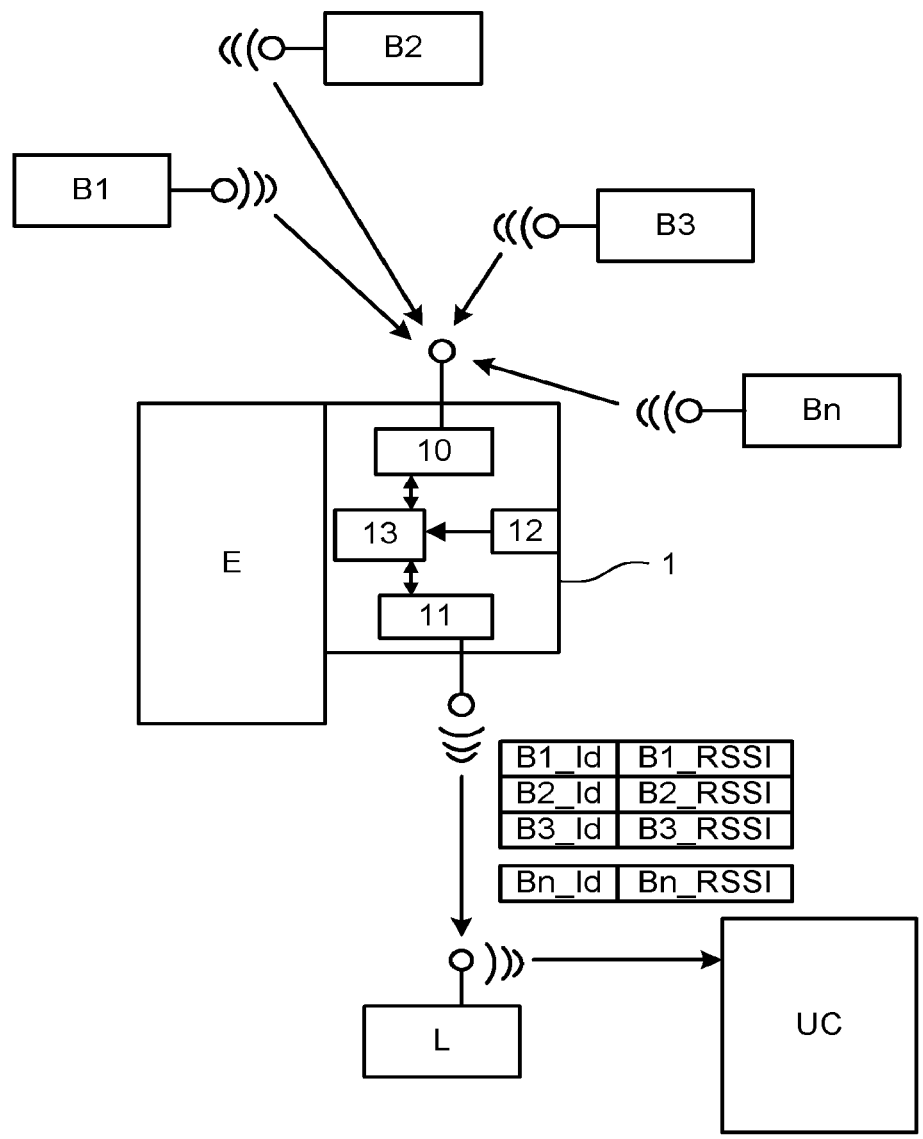

METHOD FOR DETERMINING THE GEOGRAPHIC POSITION OF AN EQUIPMENT

TECHNICAL FIELD OF THE INVENTION

The present invention relates to a method of determining the geographical position of at least one equipment unit using a device attached to said equipment unit.

PRIOR ART

Some equipment units, such as electrical equipment units, are sold via distribution channels that do not enable their manufacturer to know for which customer they are to be installed and therefore what is their final destination. Now, knowing the final destination of an equipment unit is crucial for a manufacturer wishing to track the evolution of their equipment units and to offer services, for example maintenance services, associated with that equipment unit and to carry out recalls. As the equipment units are often transported and installed in an enclosed interior space, a GPS positioning device cannot be employed.

For its part, the document US2014/128099A1 describes a solution for determining a geographical position of a mobile device in an interior space flagged by access points.

The object of the invention is to propose a reliable and simple solution that makes it possible to determine the final destination of an equipment unit.

SUMMARY OF THE INVENTION

This object is achieved by a method of determining the geographical position of at least one equipment unit using a device constrained to move with said equipment unit, including:
  a first step of determination by the device, when the latter is fixed and has not been subjected to any movement for a first particular time, of network data including the identifiers of the beacons of so-called first communication networks situated in the environment of the device and the Received Signal Strength Indication of the signals sent by each beacon,
  a second step of sending of said network data by said device to a data processing unit via a so-called second communication network if said second communication network is available,
  the first or determination step and the second or sending step being repeated after each movement of the device to a new fixed position and at the end of a second particular time identical to the first time or different,
  a step of determination of the geographical position of the equipment unit by a processing unit from the network data received after a second sending step.

In accordance with one particular feature, the method includes a step of storing the network data in a memory of the device if said second communication network is not available.

In accordance with another particular feature, the method includes:
  a step of determination by the device of said network data if the device has remained fixed for a particular time greater than said first time and said second time,
  a step of said device sending said network data to the data processing unit via a so-called third communication network identical to or different from the second communication network, if the latter is available.

In accordance with another particular feature, the method includes a step of storing the network data in the memory of the device if said third communication network is not available.

The invention also concerns the device employed to assist with the geolocation of an equipment unit, said device including:
  a microcontroller including at least a microprocessor for processing data and a memory for storing data,
  a circuit for detecting and receiving signals sent by beacons situated in its environment, adapted to collect network data including the identifiers of the so-called first communication network beacons situated in the environment of the device and the Received Signal Strength Indication of the signals sent by each beacon,
  a movement sensor connected to an input of the microcontroller and adapted to detect if the device is moving or at a fixed position,
  a clock managed by the microprocessor,
  a detection and sending circuit for detecting the presence of a beacon of a so-called second communication network and for sending said collected network data over that network in accordance with a communication protocol.

In accordance with one particular feature, the beacons of the first communication networks from which the network data is collected are WiFi or Bluetooth access points.

In accordance with another particular feature, said second communication network is of LPWAN (Low Power Wide Area Network) type.

BRIEF DESCRIPTION OF THE FIGURES

Other features and advantages will become apparent in the course of the following detailed description with reference to the appended drawings, in which:
  FIG. 1 illustrates the operating principle of the invention.

DETAILED DESCRIPTION OF AT LEAST ONE EMBODIMENT

The invention consists in determining the final destination of an equipment unit E, such as an electrical equipment unit, for example, that will often be intended to be installed in an enclosed interior space.

This invention is implemented with the aid of a device 1 attached to the equipment unit E whose final destination is needed. The device 1 is preferably fixed directly to the equipment unit E, to a support on which the equipment unit is placed or to an enclosure in which the equipment unit is packaged.

In the remainder of the description a distinction is made between first communication networks having one or more beacons B1 to Bn situated in the environment of the device 1 and making it possible to determine the geographical position of the device and a second communication network including one or more beacons L within range of the device and employed to send data to a remote processing unit UC responsible for determining the geographical position of the device.

Referring to FIG. 1, the device 1 includes a casing containing:
  a microcontroller 13 including at least a microprocessor for processing data and a memory for storing data,
  a circuit 10 for detecting and receiving signals sent by the beacons B1-Bn of the first communication networks situated in its environment, for example WIFI or Bluetooth beacons or any other type of beacon or combinations of these technologies, a movement sensor 12, for example of accelerometer type, connected to an input of the microcontroller 13 and adapted to detect if the device is moving or at a fixed position, a clock, for example of software type included in the microcontroller 13 and managed by the microprocessor, a circuit 11 for detecting the presence of a beacon L of a second communication network and for sending data over that network in accordance with its communication protocol, this second communication network being for example of the long range low bit rate type of LPWAN (Low Power Wide Area Network) type and based on a protocol such as the LoRaWAN (Long Range Wide-area network) protocol or that developed by the company Sigfox.

In accordance with the invention, using these various components, the device 1 functions as follows:

When the microcontroller 13 detects that the device is in a fixed position, i.e. that it is no longer receiving any signal from the movement sensor 12, and that the latter has not moved for a particular time (set at 15 minutes, for example) measured using its clock, it starts the detection circuit 10 in order to collect the following network data:

the identifier (B1_Id to Bn_Id) of each beacon B1-Bn of the first communication networks present in its environment (commonly known as the BSSID and corresponding to the MAC address of the WIFI access point), the Received Signal Strength Indication (B1_RSSI-Bn_RSSI) of the signals sent to it by each beacon B1-Bn. In known manner, the RSSI (Received Signal Strength Indication) may notably be used in a WIFI network to geolocate a device indoors.

When this data has been collected for this position, the microcontroller 13 stores it in its memory.

By means of the detection and sending circuit 11, the microcontroller 13 verifies the presence of a beacon L of a second communication network as described above to which the collected network data may be sent:

If such a beacon L is within its range, the microcontroller 13 commands the detection and sending circuit 11 to send the data over this network, If such a beacon L is not within its range, the microcontroller 13 retains the data in memory and will attempt to send again afterwards, when a communication network of the second communication network type will become available.

The microcontroller 13 executes these steps for as long as it regularly receives a movement signal from the movement sensor 12. After each fixed position, the microcontroller 13 therefore waits a particular time before collecting the network data and sending it over the communication network. The waiting time after a fixed position may always be the same or adapted according to various criteria, for example linked to the frequency of movement of the device from one position to another.

Using this procedure, it is therefore possible to determine the final position of the equipment unit E, even if the latter is situated in an enclosed interior space. To this end, the processing unit UC determines the geographical position of the device by looking for the data regularly received from the device in one or more databases listing the installed beacons B1-Bn and their position. As a function of the attenuation of the signals relative to each of the beacons B1-Bn, the processing unit is capable of determining a position of the device 1 and therefore of the equipment unit E.

In accordance with the invention, if the microcontroller 13 has not received any movement signal from the movement sensor 12 for a particular time greater than the time referred to above, for example 24 hours, it starts its detection and receiving circuit 10 in order to collect the network data defined above. The microcontroller 13 then starts the circuit 11 in order to find out if a beacon L of a communication network of the second communication network type is within range of the device 1. If such a network is available, the microcontroller 13 commands the circuit 11 to send the latest network data collected. If such a network is not available, the microcontroller 13 stores the data in its memory, pending the detection of such a network. This procedure is implemented periodically by the microcontroller 13 in order to detect any new beacon B1-Bn making it possible to determine or to refine the geographical position of the device and/or any new beacon L enabling sending of the network data to the remote processing unit UC.

The solution of the invention therefore has numerous advantages that the current solutions are unable to achieve. It makes it possible to determine the geographical position of an equipment unit even if the latter is located in an enclosed interior space. Moreover, it is optimized to limit the energy consumption of the device and therefore to determine the final position of the equipment unit in all circumstances.

The invention claimed is:

1. A method of determining the geographical position of at least one equipment unit using a device constrained to move with said equipment unit, comprising:

detecting, by a movement sensor that is connected to the device, movement of the device;

when the device is fixed and has not been subjected to any movement for a first particular time based on the detection of the movement sensor, performing a first step of collection of network data including the identifiers of the beacons of first communication networks situated in the environment of the device and the Received Signal Strength indication of the signals sent by each beacon; and a second step of said device sending said network data to a data processor via a second communication network if said second communication network is available, wherein the first step and the second step are repeated after each movement of the device to a new fixed position and at the end of a second particular time after reaching that new fixed position, said second time being identical to the first time or different, and wherein the method includes:

a step of determining the geographical position of the equipment unit by the data processor from the network data received after the second step.

2. The method according to claim 1, comprising a step of storing the network data in a memory of the device if said second communication network is not available.

3. The method according to claim 1, comprising:

a step of determination by the device of said network data if the device has remained fixed for a particular time greater than said first time and said second time, a step of said device sending said network data to the data processor via a third communication network identical to or different from the second communication network, if the latter is available.

4. The method according to claim 3, comprising a step of storing the network data in the memory of the device if said third communication network is not available.

5. The method according to claim 1, wherein the first particular time is at least 24 hours.

6. A system that includes a device and a movement sensor employed to assist in the geolocation of an equipment unit when being constrained to move with said equipment unit, comprising:
   a movement sensor that is connected to the device and configured to detect movement of the device; and
   processing circuitry configured to
      when the device is fixed and has not been subjected to any movement for a first particular time based on the detection of the movement sensor, start a first step of collection network data including the identifiers of the beacons of first communication networks situated in the environment of the device and the Received Signal Strength Indication of the signals sent by each beacon,
      perform a second step of sending said network data to a data processor via a second communication network if said second communication network is available, and wherein the first step and the second step are repeated after each movement of the device to a new fixed position and at the end of a second particular time after reaching that new fixed position, said second time being identical to the first time or different, wherein the data processor determines the geographical position of the equipment unit from the network data received after the second step.

7. The system according to claim 6, wherein the beacons of the first communication networks from which the network data is collected are WIFI or Bluetooth access points.

8. The system according to claim 6, wherein said second communication network is of LPWAN type.

9. The system according to claim 6, wherein the movement sensor is an accelerometer.

\* \* \* \* \*